WILLIAM RUDDOCK, INVENTOR

June 6, 1944.    W. RUDDOCK    2,350,641
TRUCK LOADER
Filed April 27, 1942    3 Sheets-Sheet 2

WILLIAM RUDDOCK,
INVENTOR

BY
ATTORNEY

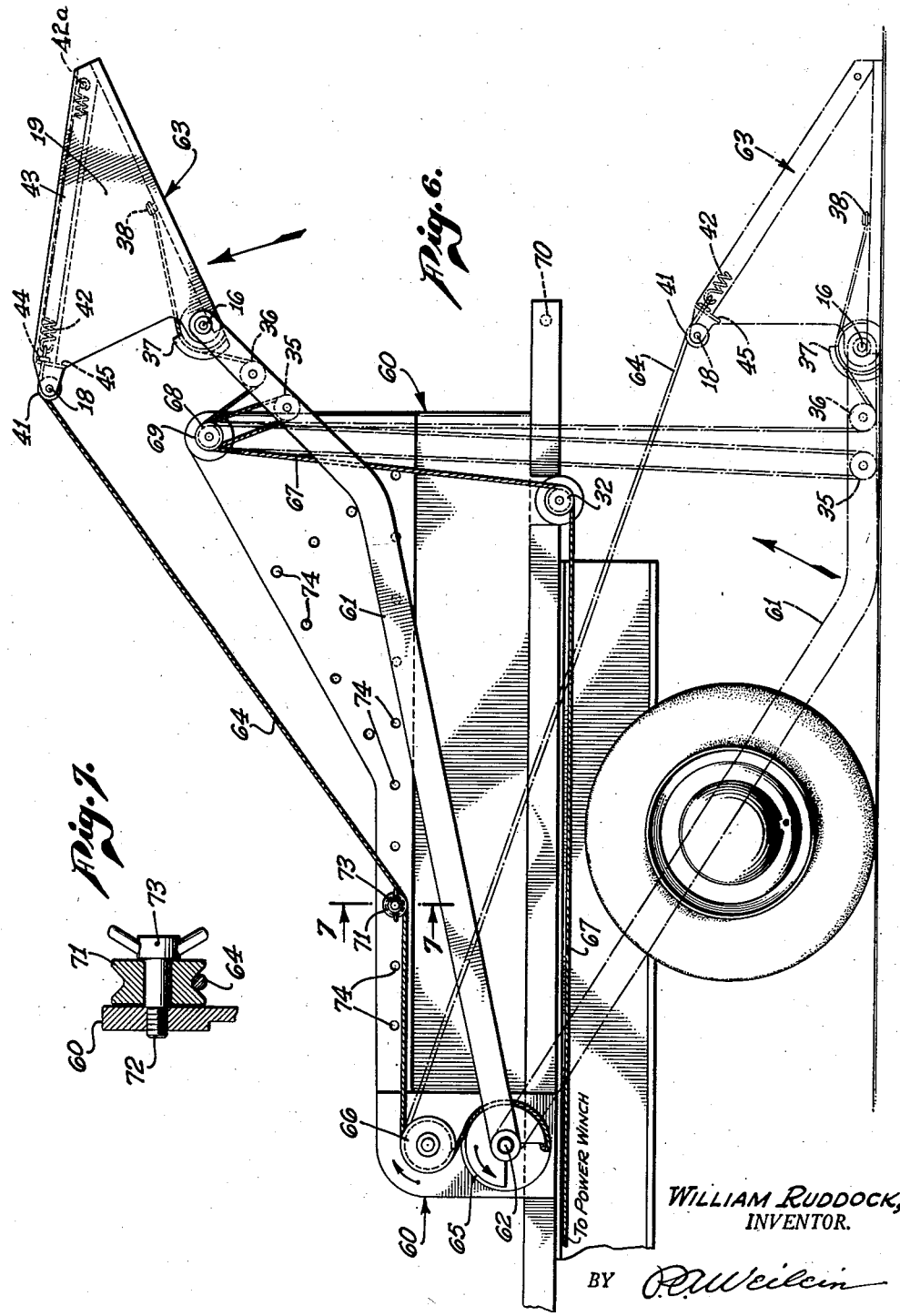

Patented June 6, 1944

2,350,641

UNITED STATES PATENT OFFICE 2,350,641

TRUCK LOADER

William Ruddock, South Pasadena, Calif.

Application April 27, 1942, Serial No. 440,598

19 Claims. (Cl. 214—75)

This invention relates to truck loaders, and more particularly to truck loaders of the type involving a mechanism mounted on the vehicle, and which include a platform which can be raised from ground level to the level of the truck bed, while loads are in place thereon.

Because of the nature of the elevating mechanisms employed in the past, these machines have been comparatively expensive, and their application limited in the main to short haul trucks, in which the saving in loading time is sufficient to justify a comparatively large investment. The mechanisms employed are often quite heavy, adding to the initial expense and lowering the useful load which the truck will carry. Such great weight is not inherent in elevating mechanisms, but is a result of the way these loaders have been designed in the past. Previous designs have utilized long lever arms which were subjected to large bending stresses while the load was being lifted, such stresses requiring heavy lever arms to withstand them.

Prior art devices require considerable alteration of the trucks to which they are applied. They also often include low hanging parts which preclude their use in situations where a truck must traverse an irregular terrain, as in construction work, farming, or warfare. Another disadvantage of previous devices of this type is the difficulty in lifting the loading platform, which is intended to serve as a tail gate, from a horizontal to a vertical position. This has been done in the past by lifting the tail gate by hand. Serious, and often fatal accidents have occurred because of the great weight of the tail gate and its height from the ground, which endanger the helper engaged in lifting the tail gate. Although mechanisms have been employed in the past which utilize a tail gate as a platform, which tail gate can be raised to a vertical position by the elevating machinery, those mechanisms suffer from the disadvantage that the platform must be lowered and the mechanism operated to raise it from such lowered position to a vertical position against the back of the truck. This is an unwarranted waste of time during loading.

In addition to the above disadvantages, loaders of previous design have been limited in their application because they will raise the load only to the level of the truck bed. In loading articles which can be stacked, such as baled hay or cotton, it is necessary to have the helper lift the bales from the loading platform to the top of bales already in place on the truck bed. This is a difficult task because of the limited space in which he is forced to work. Also, every loader of previous design, maintains a platform substantially horizontal at all stages of operation. It can be seen that it would be advantageous to have a platform which would tilt near the top of its travel to cause a load to slide onto the truck bed.

With the above limitations and disadvantages of the present types of loaders in mind, it is an object of the present invention to provide a truck loader which is light in weight compared to the load to be lifted.

It is a further object of the present invention to provide a truck loader which can be adapted to present trucks without material alteration of the truck.

It is a further object of the present invention to provide a truck loader which has no low hanging parts to interfere with the operation of the truck over irregular terrain.

It is a further object of the present invention to provide an improved truck loader in which the elevating platform forms a tail gate.

It is a further object of the present invention to provide a truck loader in which the combined tail gate and elevating platform can be raised to a vertical position by the same mechanism which lifts it from a horizontal position adjacent the ground to a horizontal position at the level of the truck bed.

It is a further object of the present invention to provide a truck loader of the type described in which the loading platform can be raised above the bed of the truck.

It is a further object of the present invention to provide a truck loader of the type described which can be utilized to raise loads to a selected height above the bed of the truck.

It is a further object of the present invention to provide a truck loader in which means is provided for tilting the load carrying platform to facilitate removal of the load therefrom onto the bed of the truck.

It is a further object of the present invention to provide a truck loader in which the elevating platform will automatically tilt upon reaching a predetermined height above the level of the bed of the truck.

This invention possesses many other advantages and has other objects which may be made more easily apparent from a consideration of one embodiment of the invention. For this purpose there are shown two forms in the drawings accompanying and forming part of the present specification. These forms will now be described in detail, illustrating the general principles of the invention; but it is to be understood that this detailed description is not to be taken in a limiting sense, since the scope of the invention is best defined by the appended claims.

Referring now to the drawings:

Figure 6 is a side elevation similar to Figure 1, of a modified form of the present invention; and Figure 7 is an enlarged fragmentary section taken on line 7—7 of Figure 6.

Figure 1:
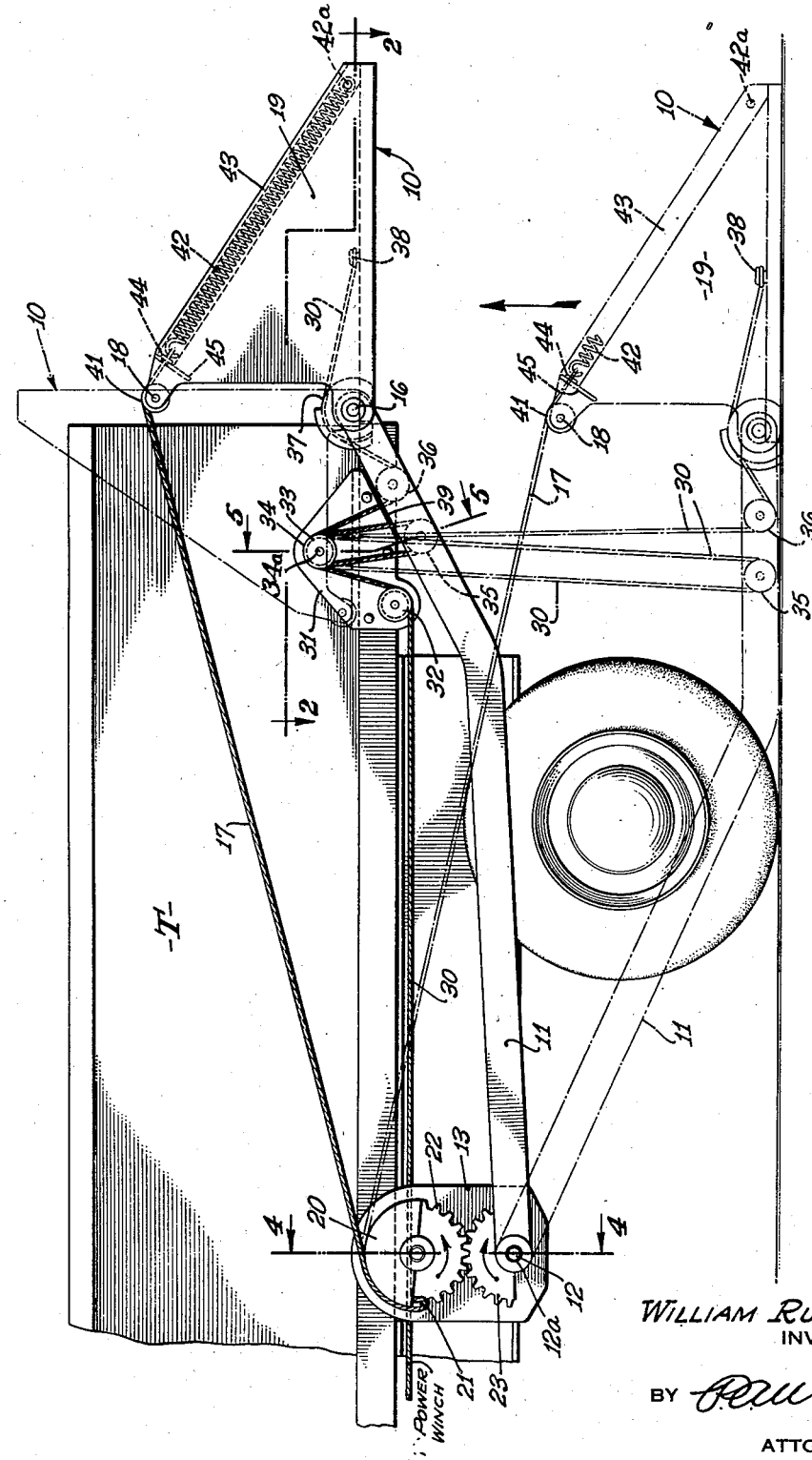
Figure 1 is a side elevation of a portion of a truck employing one form of device embodying the present invention, with the loader shown in one position in full lines and in another position in dotted lines.
Figure 2:
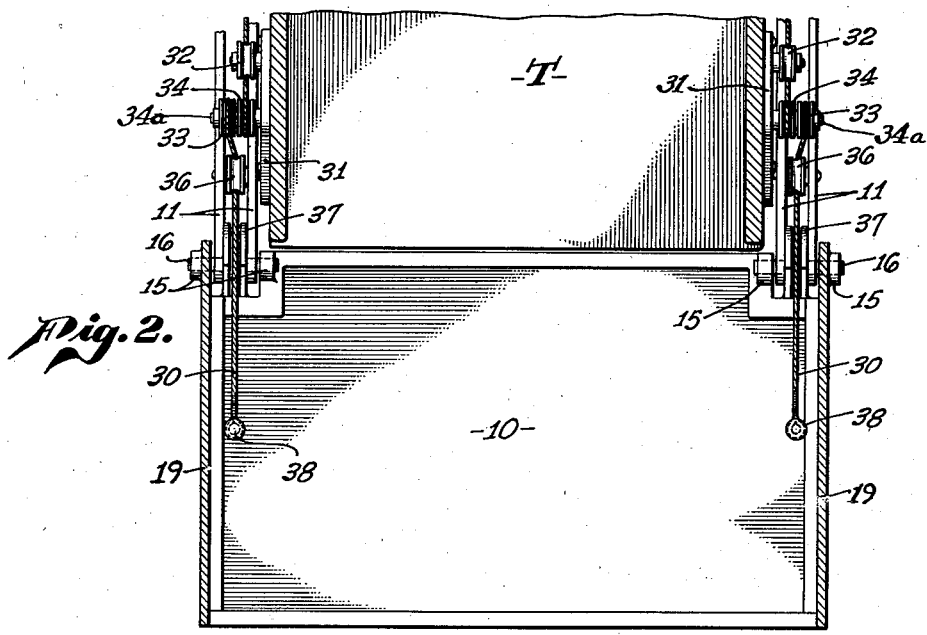
Figure 2 is a sectional view taken on line 2—2 of Figure 1.
Figure 3:
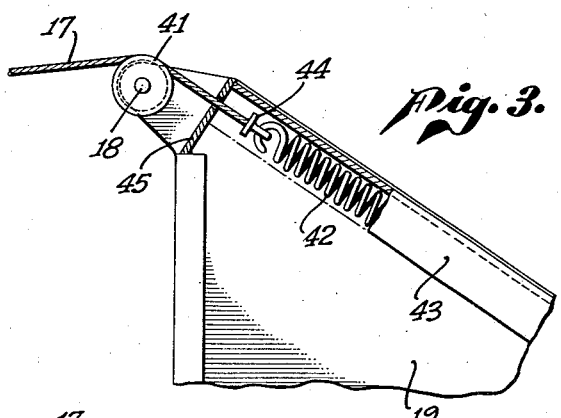
Figure 3 is an enlarged fragmentary view of a portion of the loader.
Figure 5:
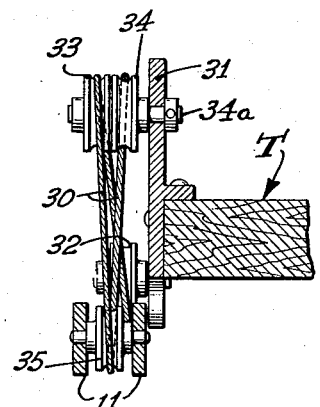
Figure 5 is an enlarged fragmentary section taken on line 5—5 of Figure 1.
Figure 4:
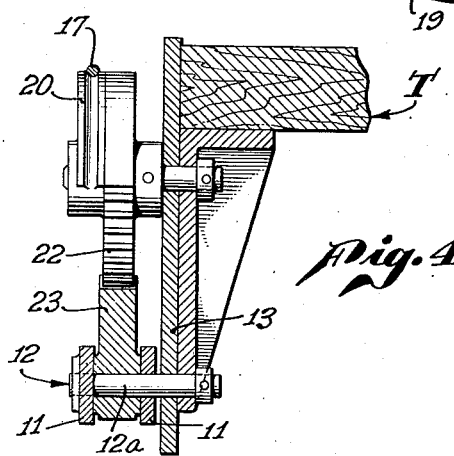
Figure 4 is an enlarged fragmentary section taken on line 4—4 of Figure 1.

The form of elevator shown in Figures 1 to 5 is adapted to transfer loads from ground level to the level of the truck bed, and the load carrying platform is arranged in such a manner that it can be utilized as a tail gate when not in use as an elevator.

The platform 10 is mounted on a pair of lever arms 11, the lever arms being pivotally mounted on the truck body T for swinging movement in a substantially vertical plane. The lever arms are pivoted to the truck body at points 12, which are preferably located as close as possible to the frame of the truck, in order that there be no low-hanging parts to interfere with the operation of the truck. At the same time, mounting the pivots 12 as close to the truck frame as possible eliminates the necessity of elaborate cross bracing between the supports to which the levers are pivoted. It is realized that the truck bed will overhang the platform 10 slightly when the platform is resting on the ground, if the pivots 12 are positioned above the middle point between the bed of the truck and the ground level. However, the position of the pivots shown has been found satisfactory in actual practice. The constructional details of the pivots 12 are immaterial, but, for the sake of constructional simplicity, the arms 11 have each been shown as secured to a short shaft 12a (Figures 1 and 4) which is in turn secured to a plate 13 attached to the side of the truck. This plate may be welded to the metallic frame of the truck or otherwise secured to the truck. Although the levers 11 may be straight, they have been shown as having a bend in their length for the purpose of permitting them to clear certain parts of the truck body in their upward travel.

During swinging movement of the levers, it is desired to maintain the platform in a horizontal position. This requires that there be relative movement between the platform 10 and the levers 11, which is readily attained by pivotally connecting the platform to the lever arms. The pivotal mounting is in the form of spaced lugs 15 secured to the platform, and pins 16 passing through these lugs and through the lever arms 11.

The mechanism employed to maintain the platform level during movement of the levers 11 includes a pair of cables 17 which are connected to the platform 10 and to the truck body. As it is desired to have the points of attachment of the cables to the truck as close to the pivots 12 as possible and at the same time have the points of attachment of the cables to the platform as widely spaced as possible from the pivot pins 16, the construction shown has been resorted to. As the cables 17 and lever arms 11 diverge from the front of the truck to the rear thereof, it is necessary to provide a means for shortening the cables during downward movement of the lever arms and the platform, and means for lengthening the cables upon upward movement of these parts. Accordingly, the cables 17 are operatively connected to the platform 10 at elevated points 18 on triangular plates 19 secured to the ends of the platform 10. So far as the present discussion is concerned, the cables 17 may be considered as permanently secured to the platform at points 18.

It now remains to provide a means for controlling the cables 17 as above described. In the device of Figures 1 to 4 the cables are controlled by the use of cams 20. These cams are secured to the plates 13 for rotation, the rotation being controlled by the movement of the levers 11. Rotation of the cams thus has a definite effect upon the length of the cables 17. The cables are secured to the cams 20 at 21, and pass around the cams to the points of attachment 18 on the platform. The cams are rotated with a definite relation to the motion of the arms 11 by means of gear sectors 22, attached to the cams, which mesh with gear sectors 23 attached to the arms 11 for rotation therewith about the pivot points 12. Although the rotating elements 20 are referred to as "cams," those shown in the drawings are truly circular, since the proportions of the various parts are such that cylindrical cam surfaces are satisfactory.

The device so far described lacks means for moving the lever arms 11, and means for causing the platform 10 to assume a vertical position when it is desired to have the platform 10 serve as a tail gate to retain the contents of the truck while the truck is in motion. Common mechanism is provided for moving the platform between the level of the ground and the truck bed and for elevating the platform 10 to a vertical position. Cables 30 are attached to the platform 10 at points 38 and are operatively connected to the arms 11 in such a manner that the elevation of the platform can be controlled by these cables, and tilting of the platform 10 to a vertical position can also be controlled by these same cables. The cables 30 are in turn controlled by any conventional power or hand driven winch (not shown).

A plate 31 is secured to each side of the truck body and carries three sheaves, 32, 33 and 34. The arms 11 each carry sheaves 35 and 36. A sheave or sheave segment 37 is secured to each end of the platform 10. These sheaves 37 need not be rotatable with respect to the platform 10 but may be conveniently secured to the platform against rotation, since they serve merely as guiding and supporting means for the cables 30. As shown in the drawings, sheaves 33 and 34 are mounted on the same shaft 34a for the sake of simplicity and compactness, but such construction is not strictly necessary. Tracing the cables 30 from the winch to the points of attachment to the platform 10, the cables pass around the sheaves 32, 33, 35, 34, 36 and 37, the ends of the cables being attached to the platform at the points 38 by means of pins or other suitable attachment means. The plates 31 are provided with abutment faces 39 which engage the arms 11 upon upward movement and limit such movement to the position shown in full lines on Figure 1.

The operation of the device should now be clear. Assuming that the mechanism is in lowered position with the platform 10 resting upon or closely adjacent the ground, as shown in the dotted line position, Figure 1, increasing the tension of the cables 30 is insufficient to cause the platform 10 to tilt upwardly, even when the platform is empty. This is because of the relationship of the weight of the arms 11, the multiplying effect of the passage of the cables back and forth between the arms 11 and the sheaves on the body of the truck, the diameter of the sheaves 37 and the relative points of attachment 38. The other cables 17 maintain the platform horizontal. When, however, it is desired to cause the platform to take a closed vertical position as a tail gate, the cables 30 are taken in by the winch until the arms 11 engage the abutment faces 39 of the plates 31. Continued taking in of these cables will lift the platform to the vertical position shown in dotted lines in Figure 1.

Raising the platform to a vertical position removes the load from the cables 17. The cables 17 therefore become slack, and unless provision is made for taking up this slack, these cables might leave the cams 20 or else whip around while the truck is in motion. For this reason sheaves 41 are secured to the triangular members 19 at the points 18, the cables 17 passing over these sheaves. Springs 42 of sufficient length and strength to maintain the cables 17 under tension when the platform 10 is raised are attached to the ends of these cables and to the outer portion of the platform as at points 42a. These springs may be enclosed in tubular members 43 for protection. Stops 44 attached to the ends of the cables 17, and, normally abutting plates 45 secured to the triangular members 19, and through which the cables pass, transfer the weight of the platform 10 to these cables. Thus the springs 42 serve no other purpose than to maintain a sufficient tension on the cables 17 to prevent them from becoming slack with the above mentioned undesired consequences thereof.

The above mechanism is for the purpose of moving loads between the ground level and the level of the truck bed. In loading bagged and baled material on a truck it is often desirable and convenient to have an elevator which will elevate the load to a height greater than the height of the truck bed. Bagged or baled material can also be successfully handled by a loader which tilts after either reaching the level of the truck or a level above that of the truck bed. Such tilting would permit the load to be more readily transferred from the load carrying platform to the truck bed or upon the material already in place thereon, and thus save the helper on top of the load considerable effort. The mechanism of Figures 1 to 5 could be utilized to accomplish this function in a number of ways. However, it is preferred to utilize the form of construction shown in Figures 6 and 7 for this purpose. As shown in Figures 6 and 7 the mechanism is essentially the same as that previously described in connection with Figures 1 to 5. The body 60 of the truck carries a pair of arms 61 pivoted thereto as at 62. These arms carry a platform 63 similar in every respect to that previously described. Cables 64 secured to the platform 63 serve to maintain the platform in a horizontal position during part of its movement. These cables 64 are taken in and payed out by cams 65, which may be attached directly to the arms 61 for rotation therewith. Sheaves 66 guide the cables 64 around these cams. This is merely a variation in the construction of the cams shown in the form of device of Figure 1, and if desired, the form of cams shown in Figure 1 may be utilized in this particular structure. The hoisting cables 67 pass around a sheave arrangement which is exactly the same as that described in connection with the device of Figure 1, with the exception that the upper sheaves 68 and 69 (corresponding to sheaves 33 and 34 of Figure 1) are considerably elevated to permit hoisting of the arms above the level of the truck bed. This device will operate as will the device of Figure 1 if stops are provided to hold the arms against upward movement when they arrive in proper position relative to the truck bed. Removable pins 70, shown in dotted lines in Figure 6, serve to prevent upward movement of the arms when the platform reaches the level of the truck bed. Continued taking in of the hoisting cables 67 will cause tilting of the platform to a vertical position to serve as a tail gate. These pins 70 must be removed if the platform is to be permitted to rise above the level of the truck bed. If this is done the arms will continue in their upward movement until they reach the sheaves 68 and 69.

In order to cause the platform to tip upon arrival at a predetermined elevation above the truck bed, small removable sheaves 71 are secured to the sides of the truck body in such a position that they will intercept the cables 64 upon elevation of the platform 63. Each of these small sheaves 71 has been illustrated in Figure 7 as being secured to a shouldered shaft 72 having a threaded end and a suitable handle 73. The threaded end of the shaft is screwed into a tapped hole which supports the sheave in the desired position. A multiplicity of these holes, as shown at 74, is provided in order to adjust the height at which tipping takes place. It will be understood, that if the sheaves 71 are attached to the truck body near the front thereof, as shown in Figure 6, tipping will take place only after the load is considerably elevated. On the other hand, if the sheaves are fastened near the rear of the truck such tipping will take place shortly after the platform 63 reaches a position on a level with the truck bed. The proper position for the sheaves 71 thus depends upon what is desired, the sheaves 71 being inserted near the rear of the truck while a first tier is being loaded, and afterwards shifted towards the front of the truck to load the tiers thereabove.

I claim:

1. In combination with a truck body, an arm connected to said truck body for swinging movement in a substantially vertical plane, a platform, means connecting said platform to said arm for movement with respect thereto, means operating said arm to move said platform between ground level and the level of the truck bed, means connecting a point on said platform above the connection of said platform to said arm, to said truck body and operative to maintain said platform substantially horizontal throughout its path of movement but permitting upward tilting of the platform with respect to said arm.

2. In combination with a truck body, an arm connected to said truck body for swinging movement in a substantially vertical plane, a platform, means connecting said platform to said arm for movement with respect thereto, means operating said arm to move said platform between ground level and the level of the truck bed, collapsible means connecting a point on said platform above the connection of said platform to said arm, to said truck body and operative to maintain said platform substantially horizontal throughout its path of movement but permitting upward tilting of the platform.

3. In combination with a truck body, an arm connected to said truck body for swinging movement in a substantially vertical plane, a platform, means connecting said platform to said arm for swinging movement with respect thereto, means moving said platform between ground level and the level of the truck bed, a flexible element connecting the platform to the truck body and operative to maintain said platform substantially horizontal throughout its path of movement but permitting swinging movement of said platform from a horizontal to a vertical position.

4. In combination with a truck body, an arm connected to said truck body for swinging movement in a substantially vertical plane, a platform, means connecting said platform to said arm for swinging movement with respect thereto, an element connecting said platform to the truck body, and operative to limit downward swinging movement of said platform, means moving said platform between ground level and the level of the truck bed, and means automatically varying the effective length of said element during such movement to maintain said platform substantially horizontal.

5. In combination with a truck body, an arm connected to said truck body for swinging movement in a substantially vertical plane, a platform, means connecting said platform to said arm for swinging movement with respect thereto, an element connecting said platform to the truck body, and operative to limit downward swinging movement of said platform with respect to said arm, means operating said arm to move said platform between ground level and the level of the truck bed, and means responsive to the movement of said arm varying the effective length of said element during such movement to maintain said platform substantially horizontal.

6. In combination with a truck body, an arm connected to said truck body for swinging movement in a substantially vertical plane, a platform, means connecting said platform to said arm for swinging movement with respect thereto, an element connecting said platform to said truck body, and operative to limit downward swinging movement of said platform with respect to said arm, means operating said arm to move said platform between ground level and the level of the truck bed, and a cam actuated by movement of said arm varying the effective length of said element during such movement to maintain said platform substantially horizontal.

7. In combination with a truck body, an arm connected to said truck body for swinging movement in a substantially vertical plane, a platform, means connecting said platform to said arm for swinging movement with respect thereto, a flexible element connecting said platform to said truck body, and operative to limit downward swinging movement of said platform with respect to said arm, means operating said arm to move said platform between ground level and the level of the truck bed, cam means movable in response to movement of the arm, and means connecting the flexible element to said cam means for winding thereon upon movement of said cam means, said cam means altering the effective length of said flexible element during movement of said arm to maintain said platform substantially horizontal.

8. In combination with a truck body, an arm connected to said truck body for swinging movement with respect thereto, a platform, means connecting said platform to said arm for swinging movement with respect thereto, a flexible element connected to said platform, a cam mounted on said truck body for rotation upon swinging movement of said arm, and means connecting said flexible element to said cam for winding movement thereon during downward movement of said arm, the point of tangency of said flexible element on said cam being positioned to cause the flexible element and the arm to converge from their points of attachment to said platform.

9. In combination with a truck body, an arm connected to said truck body for swinging movement in a substantially vertical plane, a platform, means connecting said platform to said arm for swinging movement with respect thereto, a cable connected to said platform, a sheave mounted on said truck body, and a cam mounted on said arm, said cable passing around said sheave and being secured to said cam for winding upon the surface thereof during downward movement of said arm and platform, the cable between said sheave and the platform being divergent with respect to said arm in a direction toward said platform.

10. In combination with a truck body, an arm mounted on said truck body for swinging movement in a substantially vertical plane, an elevator platform mounted on said arm for swinging movement with respect thereto, means preventing downward swinging movement of said platform from a substantially horizontal position, lifting means operatively connected to said platform and to said arm for moving said platform between ground level and the level of the truck bed, stop means engageable with the arm upon upward movement of said arm, said lifting means being operative after engagement of said arm with said stop means to cause upward swinging movement of said platform.

11. In combination with a truck body, an arm mounted on said truck body for swinging movement in a substantially vertical plane, an elevator platform mounted on said arm for swinging movement with respect thereto, means preventing downward swinging movement of said platform from a substantially horizontal position, a flexible element, means connecting said flexible element to said arm for lifting said arm, means connecting said flexible element to said platform, stop means engageable by said arm during upward movement of said arm and said platform, said flexible element being operative to cause upward swinging movement of said platform after engagement of said stop means by said arm.

12. In combination with a truck body, an arm mounted on said truck body for swinging movement in a substantially vertical plane, an elevator platform mounted on said arm for swinging movement with respect thereto, means preventing downward swinging movement of said platform from a substantially horizontal position, a sheave on said truck body, a sheave on said arm, a flexible element passing around the sheave on said truck body and the sheave on said arm and connected to said platform, stop means engageable by said arm upon upward movement, said flexible element being operative to cause upward swinging movement of said platform after engagement of said stop by said arm.

13. In combination with a truck body, an arm mounted on said truck body for swinging movement in a substantially vertical plane, an elevator platform mounted on said arm for swinging movement with respect thereto, means preventing downward swinging movement of said platform from a substantially horizontal position, a sheave on said truck body, a sheave on said arm, a second sheave on said arm having its working surface disposed above the point of attachment of said platform to said arm, a flexible element passing over the truck sheave, under the first mentioned sheave mounted on said arm and over the second mentioned sheave mounted on said arm, said flexible element being connected to said platform, stop means engageable by said arm during upward movement of said arm, said flexible element being operative after engagement of said stop means by said arm to cause upward swinging movement of said platform.

14. In combination with a truck body, an arm mounted on said truck body for swinging movement in a substantially vertical plane, an elevator platform pivoted to said arm for swinging movement with respect thereto, means preventing downward swinging movement of said platform from a substantially horizontal position, a plurality of sheaves mounted on said truck body, a plurality of sheaves mounted on said arm, a flexible element passing around the sheaves on said truck body and the sheaves on said arm whereby tension on the flexible element causes lifting of said arm, said flexible element being secured to said platform, stop means engageable by said arm upon upward movement, said flexible element being operative to cause upward pivoting movement of said platform after engagement of said stop by said arm.

15. In combination with a truck body an arm mounted on said truck body for swinging movement in a substantially vertical plane, an elevator platform mounted on said arm for swinging movement with respect thereto, a flexible element connected to said platform and operatively connected to said truck body for preventing downward swinging movement of said platform from a substantially horizontal position, means elevating said arm and said platform, stop means positioned within the plane swept by said flexible element during upward movement of said arm, whereby after engagement of said flexible element by said stop means continued upward movement of said arm causes upward swinging movement of said platform.

16. In combination with a truck body, an arm mounted on said truck body for swinging movement in a substantially vertical plane, an elevator platform mounted on said arm for swinging movement with respect thereto, a flexible element connected to said platform and operative to prevent downward swinging movement of said platform from a substantially horizontal position, means operating said arm to move said platform, and means intercepting said flexible element in its path of movement causing upward swinging movement of said platform.

17. In combination with a truck body, an arm connected to said body at a point substantially ahead of the rear wheels of the truck for swinging movement in a substantially vertical plane, a platform, means connecting said platform to said arm for movement with respect thereto, means operating said arm to move said platform between ground level and a position above the level of the truck bed, and means connecting a point on said platform above the connection of the platform to the arm, to said truck body and operating to maintain the platform substantially horizontal throughout its path of movement.

18. In combination with a truck body, an arm connected to said body at a point substantially ahead of the rear wheels of the truck for swinging movement in a substantially vertical plane, a platform, means connecting said platform to said arm for movement with respect thereto, means operating said arm to move said platform between ground level and a position above the level of the truck bed, and flexible means connecting a point on said platform above the connection of the platform to the arm, to said truck body and operating to maintain the platform substantially horizontal throughout its path of movement.

19. In combination with a truck body, a pair of arms connected on the outside respectively to opposite sides of the body for swinging movement in substantially vertical planes past the body, a platform, means connecting said platform respectively to said arms for movement with respect thereto, means operating said arms to move said platform between ground level and a position above the ground, and means connecting opposite points on said platform above the connections of the platform to the arms, to said truck body and operating to maintain the platform substantially horizontal throughout its path of movement.

WILLIAM RUDDOCK.